United States Patent [19]

Van Linden et al.

[11] 4,286,985
[45] Sep. 1, 1981

[54] VORTEX MELTING SYSTEM

[75] Inventors: Jan H. L. Van Linden, Hamptown Township, Allegheny County, Pa.; Jeffrey B. Gorss, Newburgh, Ind.

[73] Assignee: Aluminum Company of America, Pittsburgh, Pa.

[21] Appl. No.: 135,917

[22] Filed: Mar. 31, 1980

[51] Int. Cl.³ .............................................. C22B 21/00
[52] U.S. Cl. ................................. 75/65 R; 75/68 R; 266/901
[58] Field of Search ..................... 75/68 R, 65, 43, 46; 266/901, 233

[56] References Cited

U.S. PATENT DOCUMENTS

| 3,272,619 | 9/1966 | Sweeney et al. | 75/65 R |
| 3,997,336 | 12/1976 | Van Linden et al. | 266/901 |
| 4,008,884 | 2/1977 | Fitzpatrick et al. | 75/65 R |

Primary Examiner—Melvyn J. Andrews
Attorney, Agent, or Firm—Elroy Strickland

[57] ABSTRACT

An improved method and apparatus for ingesting and melting metal scrap that otherwise tends to float on the surface of a molten melting media. The method includes the steps of providing a supply of the melting media and directing the media from the supply to an upper portion of a receptacle having an outlet opening in the lower portion thereof. The flow of the melting media entering the receptacle produces a free vortex of the media in the receptacle, as the media flows out the lower opening. The amount of the flow of the melting media to the receptacle and the size of the lower opening are such that a predetermined level of the media is maintained in the receptacle. The symmetry and continuity of the flow pattern of the vortex are disturbed in such a manner that floating metal solids (and any associated skim material) entering the vortex from the upper portion of the receptacle are rapidly ingested into the melting media. Such ingestion is much more effective than the limited ingestion capability of an undisturbed vortex.

2 Claims, 3 Drawing Figures

VORTEX MELTING SYSTEM

BACKGROUND OF THE INVENTION

The present invention relates generally to the melting of solid scrap metal in a molten melting media and particularly to a method and apparatus for more effective melting of scrap metal and ingestion of any skim material associated with the media and scrap.

Interest remains high in reclaiming (recycling) metal scrap, particularly lightweight metal scrap such as aluminum. The collection and remelting of solid scrap material are more efficient than the production of new metal, since such production involves mining the original ores and processing the same to extract the metal therefrom. A particularly useful process in regard to remelting metal scrap is a continuous remelt process in which superheated molten metal is circulated from a heating bay to a scrap charging bay by a pump located in the charging bay. Scrap metal is fed to the charging bay from a position over the rotor of the pump. The pump rotor creates a vortex of the melting media in the charging bay that serves to submerge and ingest the scrap in the media. Without such an ingestion process, metal scrap having a large surface to weight ratio tends to float on top of the melting media. Continuous melting processes using pump ingestion are disclosed in U.S. Pat. Nos. 3,997,336 and 4,128,415 to Van Linden et al.

Also known is a process described in U.S. Pat. No. 3,272,619 to Sweeney et al in which a pump is used to direct molten metal from a furnace (containing the metal) and to a hopper structure. In the hopper, the flow of metal is tangential along the side wall thereof, such that the metal forms a vortex as it cascades downwardly through the hopper and out a bottom outlet of the hopper. The hopper and pump are raised and lowered by a reversing motor and supporting frame and linkage to maintain appropriate submersion of the pump and hopper when the height of the molten metal fluctuates. Such fluctuation occurs when the scrap material is fed to the hopper and when metal is removed from the furnace. In addition, the text of the patent indicates that the intensity of the vortex is increased when the hopper is in a raised position, such that solids in the media are more rapidly submerged for flow through the bottom outlet of the hopper.

SUMMARY OF THE INVENTION

The present invention is directed to an improvement of the melting processes disclosed in the above U.S. patents to Van Linden et al and in the above U.S. Pat. No. 3,272,619 to Sweeney et al. The invention includes a receptacle for receiving charges of metal scrap and a superheated supply of molten media, the receptacle being separate from a pump employed to circulate the superheated media to and from the receptacle. The media is pumped from a heat bay by the pump, and directed to the upper portion of the receptacle. The media enters the receptacle in a manner that creates a free vortex of the media within the receptacle, as media flows from the receptacle via an opening provided in the lower portion of the receptacle. In the present invention, the symmetry of the free vortex is disrupted in such a manner that floating solids entering the vortex (from the top of the receptacle) are quickly ingested into the media, the metal of the solids being melted therein. This is accomplished by providing two interacting flow patterns in the vortex which cause the media to roll over in the receptacle, this "roll-over" being the mechanism that provides the rapid ingestion. The roll-over action is described in greater detail below.

The media, which now includes the scrap, flows from the lower opening of the receptacle to a skim bay and then to the heating bay. Skim and other buoyant foreign particles in the media leaving the receptacle are directed in an upward direction in the skim bay where they are removed from the system of the invention.

The disrupted pattern of the vortex of the invention is far more effective in ingesting floating metal scrap and even buoyant skim material than the undisturbed pattern of a free vortex. The flow pattern of a free vortex is ordinarily circular and symmetrical and the eye of the vortex is narrow such that floating solids will tend to flow with and stay in the circular pattern without being ingested into the molten media, which is necessary to obtain an acceptable melt rate.

An additional advantage of the present invention is that there is no pump rotor or propeller in the mixing receptacle to become clogged and/or damaged with solid scrap and/or foreign material in the process of ingesting solid materials. Further, with a pump that is separate from the charging area, the design of such a pump can be optimized for circulating only liquid metal, without concern for the process of ingesting solid material.

THE DRAWINGS

The invention, along with its objectives and advantages, will be best understood from consideration of the following detailed description in conjunction with the accompanying drawings in which.

A PREFERRED EMBODIMENT OF THE INVENTION

Figure 1:
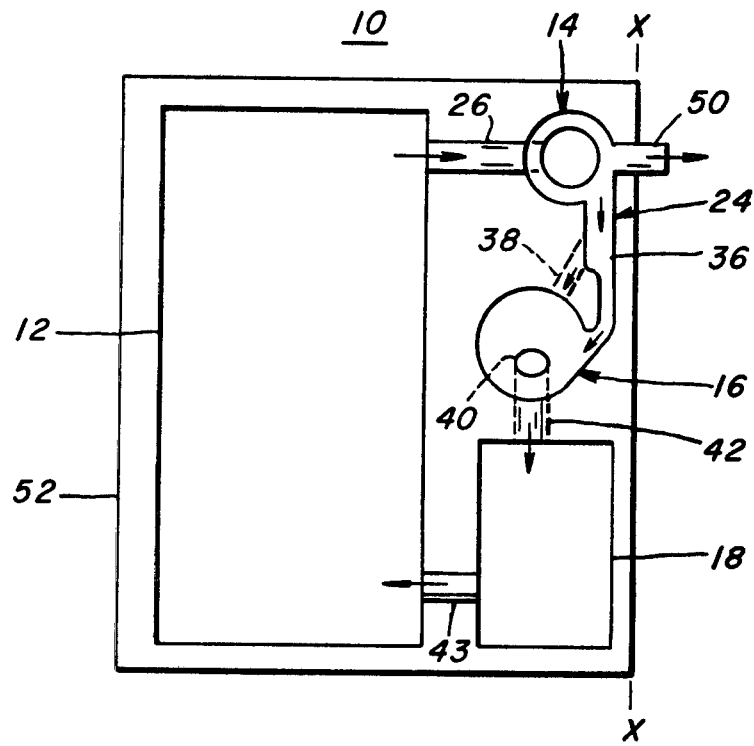
FIG. 1 is a diagrammatic plan view of a continuous melting system using the pump and receptacle arrangement of the invention.

Referring now to FIG. 1 of the drawings, a circulatory continuous melting system 10 is shown schematically, the system incorporating the present invention. In system 10, molten melting media (not shown) is circulated from a heating bay 12 by a pump means and bay 14 to a receptacle means 16. Scrap metal solids (not shown) are introduced into receptacle 16 from a location above the receptacle to be submerged and melted therein. Thereafter, the melt, which now includes melted scrap, is circulated back to heating bay 12 preferably via a fluxing bay 18 that provides an opportunity to remove skim material, as mentioned above, from the melting media. Molten metal product is removed from the system at a rate commensurate with the feed rate of scrap metal to receptacle 16, and in ways explained in detail hereinafter.

In the heating bay 12 the melting media is heated to a temperature significantly above the melting temperature of the scrap metal entered at 16 to provide the latent heat necessary to melt the charge. This is generally referred to as superheating, that is, heating substantially above the melting temperature of the scrap charge to 16 such that substantial heat can be removed in the process of melting scrap without solidification of the melting media. When the melting media is molten aluminum, a suitable temperature range of the aluminum leaving the heating bay 12 is about 1400° to 1500° F. A typical temperature for aluminum exiting receptacle 16 is on the order of 1300° F., depending on the rate at which charge material (scrap) is fed to the system (10) and the rate at which the molten media is circulated in the system.

Figure 2:
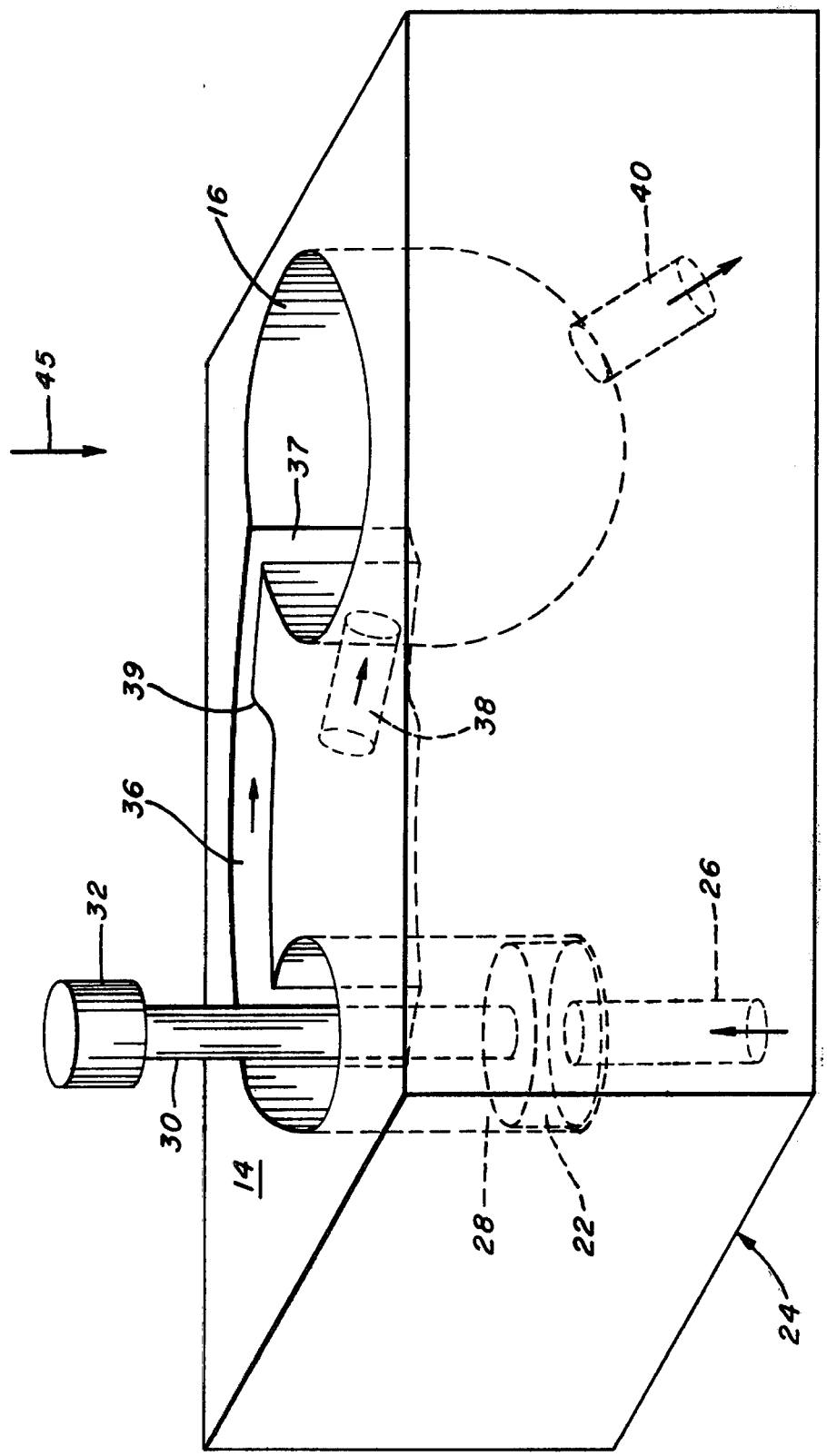
FIG. 2 is a perspective view of a portion of the arrangement of FIG. 1.

FIG. 2 of the drawings shows the pump and receptacle arrangement in perspective and in a manner that reveals a rotor or propeller 22 of pump 14 and the flow passages inside a housing structure 24 that are capable of confining and directing molten media in a manner presently to be described. The housing may be an integral structure, as shown in FIG. 2, made of a refractory material, or the pump and receptacle sections thereof may be separate structures connected together in fluid communication via suitable conduit or channel structures.

In either case, pump 14 may be of the type disclosed in the above U.S. Pat. No. 4,128,415 to Van Linden et al, though if the Van Linden et al pump is used, no vortex-inducing vanes 100 are applied. As indicated earlier, pump 14 needs only the capability of circulating the molten media in an efficient manner.

The pump in FIG. 2 receives molten media through a bottom inlet port 26 (from heating bay 12) and develops a head (not shown) of the media in container area 28 of the pump (and in receptacle 16 in a manner explained below) that envelops rotor 22 and a drive shaft 30. In FIG. 1, inlet port 26 is depicted as a conduit connecting 12 and 14 together in fluid communication.

The rotor of the pump, driven by a suitable motor 32 (FIG. 2), directs the molten media in the container area 28 of the pump to receptacle 16 via a first channel or passage 36 and via a second channel 38. Channel 36 intersects the side of the receptacle in a tangential manner to provide a slotted opening therein, at 37, while 38 intersects the side of the receptacle in a substantially radial manner and at a location circumferentially spaced from the first channel and opening. In addition, channel 38, in FIG. 2, intersects channel 36 at a location intermediate the pump and receptacle, and at a height that is below the level or head of molten media that is maintained in channel 36 by pump 14.

As further seen in FIG. 2, the cross section of first channel 36 is reduced at 39, which is downstream from pump 14 and in the vicinity of the tangential inlet to receptacle 16. This assures an adequate flow of the media through 38 for purposes explained below.

Still referring to FIG. 2, receptacle 16 is provided with an outlet 40 located in a lower portion of the wall of the receptacle, the wall having an inside surface that curves downwardly to the opening.

The outlet 40 is connected to skim bay 18 by a conduit 42 shown schematically in FIG. 1. Bay 18 is, in turn, connected to heating bay 12 by a conduit 43, in FIG. 1, to complete the fluid circuit of system 10.

Operation of the system depicted in FIGS. 1 and 2 is as follows. A molten media capable of melting solid metal scrap supplied to receptacle 16 is provided in the structure of heating bay 12. Such a media may be molten salt or molten metal, the media being heated in 12 by suitable heating means (not shown). Pump 14 is operated by motor 32 to draw the heated media from 12 and direct the same to the side of 16 via the two paths of channels 36 and 38. This is indicated by appropriate arrows in FIG. 2. The flow of the media into receptacle 16 via channel 36 and slotted opening 37 is tangential along the wall of the receptacle such that a free vortex (not shown) of the media is created in the receptacle, the media, guided by the wall of the receptacle, flowing out of the receptacle via outlet 40, under the force of gravity. This is indicated in FIG. 2 by an arrow in bottom outlet 40. The capacity of the pump is such that the amount of the molten media directed to the receptacle is sufficient to provide a continuous flow of the media through the lower outlet of the receptacle. The pump output and the output from outlet 40 provide an equilibrium or steady-state output with a certain head at the rate of flow of the molten media. The head is changed by simply changing the volume of media pumped by 14.

Solid metal scrap to be ingested in the media in receptacle 16 is fed to the upper portion of the receptacle, as indicated schematically in FIG. 2 by arrow 45.

A portion of the molten media that enters main channel 36 from the pump 14 divides and flows through channel 38 to enter the side of receptacle 16 at a location spaced from 37 and in a manner that directs the media in an essentially radial direction directly into the eye of the vortex of the media in 16 and at a velocity sufficient to disrupt or "break up" the continuity and symmetry of circular flow pattern created by the stream of media entering the receptacle through channel 36. This disruption or break-up of the flow involves a flow pattern in which the media in the upper portion of the vortex rolls over the portion receiving the impact of the radially directed flow from channel 38. This roll-over action causes rapid ingestion of solid metal scrap into the media as the scrap descends from the upper portion of the receptacle.

The ingested scrap in the present invention is thereby quickly melted and conveniently leaves the receptacle via lower opening 40. Any skim material associated with the scrap and/or melting media is also rapidly ingested into the vortex and directed through lower opening 40. Because of this capability, skim does not accumulate in the receptacle either as solid deposits on the wall of the receptacle or in an endlessly floating manner. As indicated above, without the roll-over effect of the present invention, solid material tends to linger in the circular path of the vortex of the molten media only slowly being submerged into the media and directed through the exit opening in the bottom of the receptacle with the media. The roll-over effect then insures a clear path for the flow of scrap particles through the receptacle and out of the receptacle through lower opening 40.

From the lower opening 40 in receptacle 16 the melt and skim are directed to bay 18 (FIG. 1). The skim is collected in and removed from bay 18 by known techniques which are not a part of the present invention.

Figure 3:
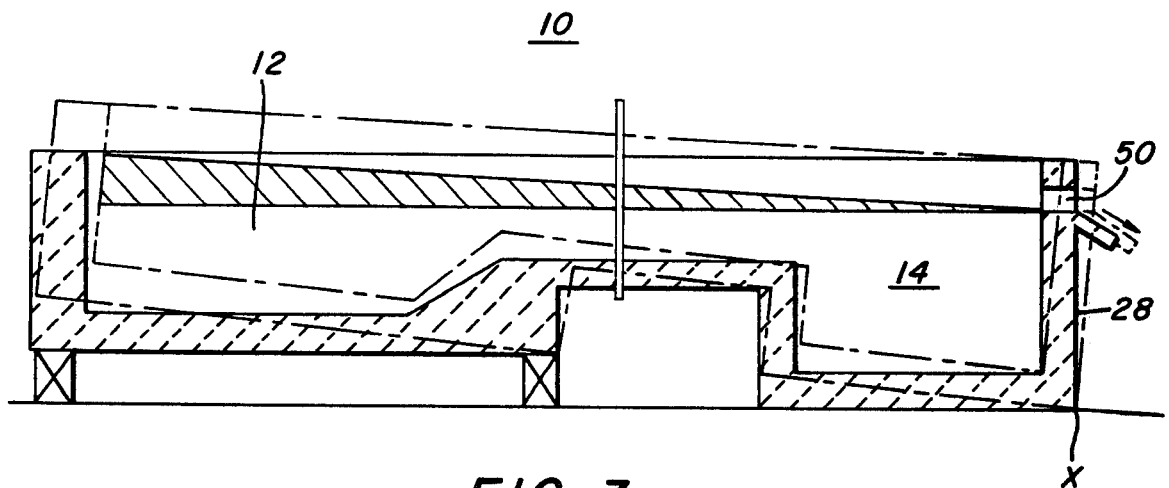
FIG. 3 shows a method of removing melt from the system of the invention.

A convenient process for removing melt from system 10 is shown in FIG. 3. The present invention is, of course directed to reclaiming and recycling metal scrap, and hence molten metal in the system of the invention is removed therefrom at a rate commensurate with the rate at which scrap is fed to the system. The removal can be periodic or continuous. For example, a weir (not shown) located adjacent the upper edge of a wall section of the heating bay can provide continuous removal of molten metal from the system. In the above U.S. patent to Sweeney et al, an outlet opening is provided in the side wall of a furnace to permit periodic removal of melt from the furnace. In the present invention the melt can also be removed periodically from the system by periodically rotating the system only a few degrees about a pivot location, 3 degrees, for example, with only a minimum change in the level of metal in the charging receptacle. This is best seen in FIG. 3, where approximately one-half of the contents of a relatively shallow heating bay 12 is removed by only minor upward rotation of the bay, and the associated pump and skim bay, about pivot location X. The rotation is indicated in FIG. 3 by dot-dash outline of the bay and pump areas. If the cross-sectional area of melt removed from bay 12, as shown in hatched outline in FIG. 3, is 8 feet long, $\frac{1}{2}$ foot deep at the more shallow, right-hand end and 1 foot at the deeper, left-hand end, and if the heating bay is 18 feet long, the volume of metal removed from the bay is 108 cubic feet of metal ($18 \times \frac{3}{4} \times 8 = 108$ ft$^3$). The metal can leave the bay and the system of the invention through an opening 50 in the wall of the pump container 28. Appropriate arrows in FIGS. 1 and 3 indicate the discharge of media from the system via opening 50. The displacement of metal in this fashion depends on size and location of the equipment relative to the pivot axis.

In FIG. 1 the system of the invention is shown located on a support platform 52, in plan view. If the system is rotated in the manner of FIG. 3, the support is rotated about a pivot line X—X, this line being along the right-hand edge of the platform in the view of FIG. 1.

While the invention has been described in terms of preferred embodiments, the claims appended hereto are intended to encompass all embodiments which fall within the spirit of the invention.

What is claimed is:

1. An improved method of ingesting and melting metal scrap in a molten melting media, comprising:
   providing a supply of the melting media,
   directing melting media from the supply to the upper portion of a receptacle having an outlet opening in the lower portion,
   directing the media into the receptacle in a manner that provides a free vortex of the media in the receptacle,
   maintaining the flow of the media to the receptacle in a manner that provides a predetermined level of the media in the receptacle as the media flows from the receptacle through the opening in the lower portion thereof,
   introducing metal scrap into the receptacle and media, and
   dividing the media directed to the receptacle into two paths to disrupt the symmetry of the vortex in a manner that enhances the ingestion of the metal scrap into the media.

2. The method of claim 1 in which one of the paths intersects the side the side of the receptacle in a tangential manner while the other path intersects in a substantially radial manner.

* * * * *